(12) United States Patent
Kim

(10) Patent No.: US 10,715,708 B2
(45) Date of Patent: Jul. 14, 2020

(54) CAMERA MODULE PACKAGE AND METHOD OF MANUFACTURING THE SAME

(71) Applicant: Hyundai Mobis Co., Ltd., Seoul (KR)

(72) Inventor: Hyung Min Kim, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/267,712

(22) Filed: Feb. 5, 2019

(65) Prior Publication Data

US 2019/0260918 A1     Aug. 22, 2019

(30) Foreign Application Priority Data

Feb. 7, 2018  (KR) .......................... 10-2018-0015192

(51) Int. Cl.
*H04N 5/225*     (2006.01)

(52) U.S. Cl.
CPC ......... *H04N 5/2254* (2013.01); *H04N 5/2252* (2013.01)

(58) Field of Classification Search
CPC ... H04N 5/2254; H04N 5/2257; H04N 5/2252
See application file for complete search history.

(56) References Cited

U.S. PATENT DOCUMENTS

| | | | |
|---|---|---|---|
| 2009/0129412 A1 | 5/2009 | Kim | |
| 2010/0086761 A1* | 4/2010 | Okuda | ................. B29C 65/1616 428/220 |
| 2014/0298642 A1* | 10/2014 | Sesti | ....................... G02B 7/025 29/592.1 |
| 2017/0146701 A1* | 5/2017 | Nagahama | ............... G03B 9/02 |
| 2018/0098033 A1* | 4/2018 | Mleczko | ................ H04N 7/183 |

FOREIGN PATENT DOCUMENTS

WO         2012019940         2/2012

* cited by examiner

*Primary Examiner* — Yogesh K Aggarwal
(74) *Attorney, Agent, or Firm* — H.C. Park & Associates, PLC

(57) ABSTRACT

The present disclosure relates to a camera module package and a method of manufacturing the same, and the camera module package includes a front body including a housing, a lens, and a retainer; a rear body disposed behind the front body with an interval therebetween; and a PCB provided with an image sensor mounted between the front body and the rear body. According to the present disclosure, performance can be improved after six-axis alignment of a front body formed of a laser light transmissive molded body, a rear body formed of a laser light absorptive molded body, and a PCB including an image sensor, and a process is simplified, components are simplified, and production costs are reduced.

15 Claims, 2 Drawing Sheets

CAMERA MODULE PACKAGE AND METHOD OF MANUFACTURING THE SAME

CROSS-REFERENCE TO RELATED APPLICATION

This application claims priority from and the benefit of Korean Patent Application No. 2018-0015192, filed on Feb. 7, 2018, which is hereby incorporated by reference for all purposes as if set forth herein.

BACKGROUND

Field

Exemplary embodiments relate to a camera module package and a method of manufacturing the same, and more particularly, to a camera module package assembled by laser welding and a method of manufacturing the same.

Discussion of the Background

Generally, a digital camera module used for a PC camera, a digital camera, a cell phone, a PDA, and the like has an image sensor essentially applied to a technology for storing and transmitting a digital image and additional optical technologies applied thereto to perform picture transmission and image data feedback in real time, and since a camera product group to which a current digital camera module is applied is complexified, multi-fuctionalized, and minimized, the digital camera module is gradually miniaturized and lightened.

Further, in a trend in which a high resolution image sensor (for example, CCD and CMOS) is commercialized, since a lens corresponding to the above is microminiaturized and highly precise, a lens assembly of the camera module has also been miniaturized.

As described above, as the lens assembly of the camera module is miniaturized, mutual assemblability of a lens or a lens product group and assembly of the lens or the lens product group at an accurate location without separation have become very important.

Further, a conventional camera module is assembled by a wire assembly method, specifically, is assembled through a silicone process for waterproofing between a mold and a cable, a process of mounting an O-ring for waterproofing between the mold and a chassis, a screw process for fastening between the mold and the chassis, and the like.

However, in the above-described conventional method of assembling the camera module, faulty waterproofing due to a mistake of a worker and silicone application in a non-uniform amount occurs, and a working environment is poor due to the silicone process.

Further, in the conventional method of assembling the camera module, since a method of fixing the lens using epoxy is used, resolution is degraded due to a phase change of the epoxy during a UV process and heat curing and thus it is difficult for resolution having uniformly quality to be obtained, and since a process is complicated, a quality problem during a manufacturing process occurs.

The above information disclosed in this Background section is only for enhancement of understanding of the background of the invention and, therefore, it may contain information that does not constitute prior art.

SUMMARY

Exemplary embodiments of the present invention are directed to providing a camera module package which is subjected to six-axis alignment of a front body formed of a laser light transmissive molded body, a rear body formed of a laser light absorptive molded body, and a printed circuit board (PCB) including an image sensor and then fixed through laser welding and a method of manufacturing the same.

According to an aspect of the present disclosure, there is provided a camera module package for a vehicle including a front body including a housing, a lens, and a retainer; a rear body disposed behind the front body with an interval therebetween; and a PCB provided with an image sensor mounted between the front body and the rear body.

Further, the front body, the rear body, and the PCB may be subjected to six-axis alignment and then laser-welded.

In addition, the front body may be formed of a laser light transmissive molded body.

In addition, the housing may be integrally formed with a barrel to fix the lens and the retainer.

In addition, the rear body may be formed of a laser light absorptive molded body.

According to another aspect of the present disclosure, there is provided a method of manufacturing a camera module package for a vehicle including manufacturing a rear body having an open front a mounting space formed therein; mounting a PCB provided with an image sensor in the mounting space of the rear body; mounting a front body including a housing, a lens, and a retainer in front of the rear body; and aligning the rear body, the PCB, and the front body and then laser-welding the rear body, the PCB, and the front body.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principle of the invention.

DETAILED DESCRIPTION OF EXEMPLARY EMBODIMENTS

Figure 1:
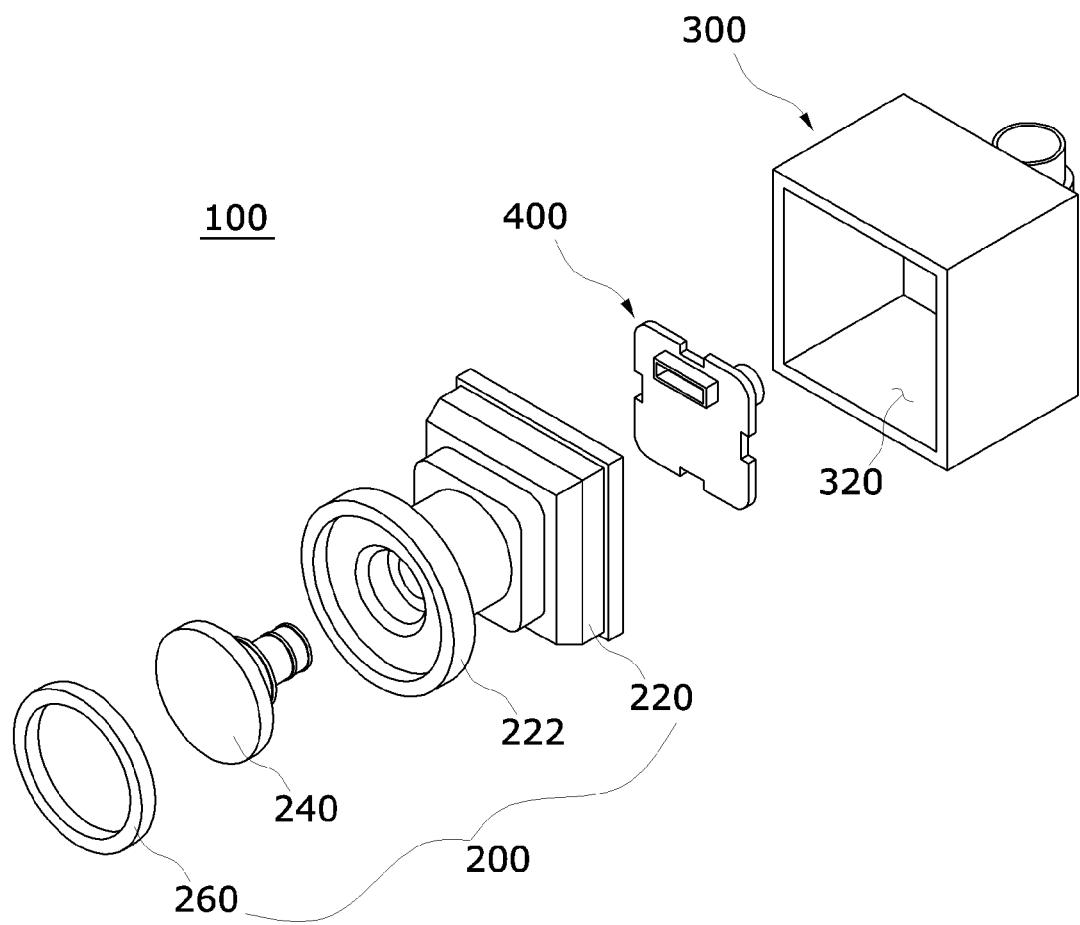
FIG. 1 is a configuration view illustrating a camera module package according to the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
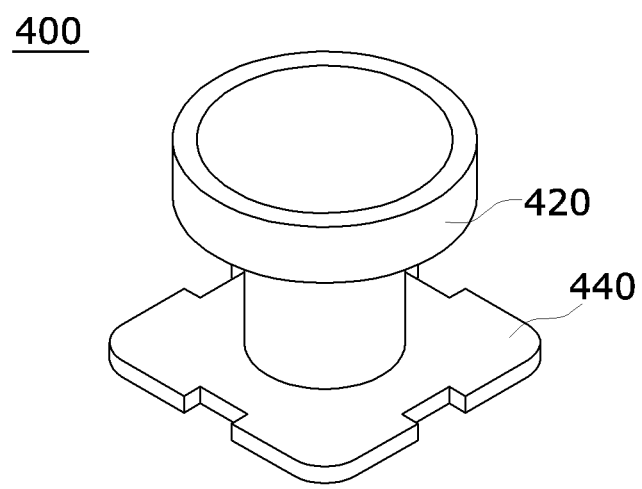
FIG. 2 is a view illustrating a PCB configuring the camera module package according to the present disclosure.
Figure 3:
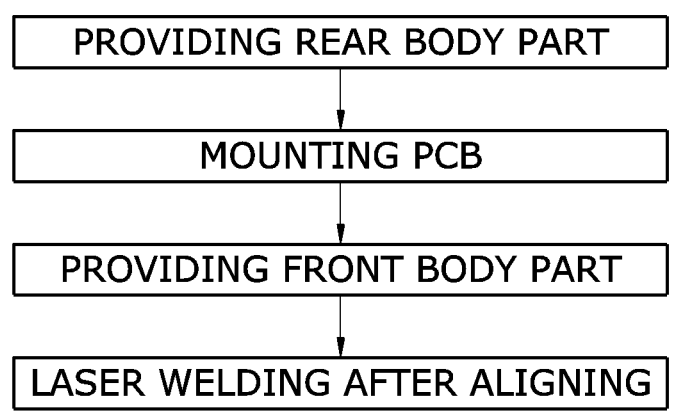
FIG. 3 is a flow chart illustrating a method of manufacturing a camera module package for a vehicle according to the present disclosure.

Hereinafter, in a detailed description of an exemplary embodiment of the present disclosure with reference to the accompanying drawings, FIG. 1 is a configuration view illustrating a camera module package according to the present disclosure, and FIG. 2 is a view illustrating a PCB constituting the camera module package according to the present disclosure.

A camera module package 100 which is the present disclosure includes a front body 200, a rear body 300, and a PCB 400.

Here, the front body 200, the rear body 300, and the PCB 400 constituting the camera module package 100 are subjected to six-axis alignment and then fixed by laser welding, and the camera module package 100 is fixed by a screw according to an environment or the like.

The front body 200 is disposed at the front.

Here, the front body 200 is formed of a laser light transmissive molded body.

Further, the front body 200 includes a housing 220, a lens 240, and a retainer 260.

The housing 220 is variously formed according to an environment, a purpose, and a shape of the lens 240, and formed in a hollow shape, and a barrel 222 in which the lens 240 and the retainer 260 are mounted is integrally formed at the front.

That is, the housing 220 is formed in the hollow shape and integrally formed with the barrel 222, in which the lens 240, the retainer 260, and other various configurations are mounted, at the front to improve ease of assembly and operations of the front body 200.

Further, a lens, a spacer configured to adjust an interval of the lens, a filter configured to block light of an unnecessary wavelength range, and an O-ring configured to block introduction of moisture and foreign matter to the inside are selectively mounted in the housing 220, and a coating agent may be applied on an outer surface of the housing 220 to block introduction of light from an unnecessary light source.

The lens 240 is inserted into the housing 220 and a front portion of the lens 240 is located at the barrel 222.

Here, the lens 240 is configured by selecting a lens applied to a known camera module, and a separate description will be omitted in the present disclosure.

The retainer 260 is mounted at an end portion of the barrel 222 constituting the housing 220.

Further, the retainer 260 is formed of a flexible material such as rubber, silicone, or the like.

That is, the retainer 260 fixes the lens 240 to the housing 220 and blocks the introduction of the external foreign matter into the housing 220.

The rear body 300 is disposed behind the front body 200 with an interval therebetween.

Here, a shape of the rear body 300 is not limited to the illustrated drawings and variously formed according to an environment and a purpose, and in the present disclosure, the rear body 300 has a mounting space 320 formed in a rectangular shape therein, and is formed of a laser light absorptive molded body.

That is, the rear body 300 has an open front in a rectangular shape, and has the mounting space 320 formed therein to accommodate the PCB 400.

The PCB 400 is mounted between the front body 200 and the rear body 300.

Further, the PCB includes an image sensor 420 configured to convert a light source collected at the lens 240 to an electrical signal and a substrate 440 on which the image sensor 420 is mounted.

That is, the PCB 400 includes the substrate 440 on which the image sensor 420 configured to generate an image by imaging light incident through the lens 240 is mounted.

In this case, an alignment of the image sensor 420 and the lens 240 is important, the image sensor 420 and the lens 240 are especially managed through an effective focal length (EFL), a back focal length (BFL), a front focal length (FFL), and the like, and the lens is developed according to requirements of a pixel size, a chief ray angle (CRA), RE-ILL, an f-number (F/NO), and a field of view (FOV).

A description with reference to an embodiment of the above-described camera module package and a method of manufacturing the same will be described below.

First, the rear body 300 having the open front in the rectangular shape, and having the mounting space 320 formed therein is formed.

Further, the PCB including the image sensor 420 configured to convert the light source collected at the lens 240 to the electrical signal and the substrate 440 on which the image sensor 420 is mounted is mounted in the mounting space 320 included in the rear body 300.

Next, the front body 200 including the housing 220 formed in a hollow shape and having the barrel 222 in which the lens 240, the retainer 260, and other configurations are mounted in a frontward direction, the lens 240 mounted through the barrel 222 of the housing 220, and the retainer 260 configured to fix the lens 240 to the barrel 222 of the housing 220 is mounted in front of the rear body 300.

Then, when the rear body 300, the PCB 400, and the front body 200 are subjected to six-axis alignment and then fixed by laser welding, the assembly of the camera module package 100 is completed.

Here, an assembly order of the camera module package may be different from the above.

That is, the camera module package 100 may minimize an effect of heat while improving precision through contactless laser welding in which the rear body 300, the PCB 400, and the front body 200 are assembled and then a laser beam is irradiated to only a minimum portion of a welding surface.

In addition, since the camera module package 100 is fixed through the laser welding, effects which will be described below may be obtained.

First, since epoxy is not used, defocusing during UV and heat curing does not occur, and units per hour (UPH) may increase due to deletion of an UV and heat curing process.

Further, since the laser welding process is applied, an epoxy applying process or a screw process may be deleted, and a pre-focusing process may be excluded.

In addition, since the barrel and the housing are integrally formed, a lens-barrel component may be deleted, and an epoxy component or a screw component may be deleted.

Next, a known six-axis alignment device may be used as a six-axis alignment device configured to align the rear body 300, the PCB 400, and the front body 200, and a separate description will be omitted.

According to the present disclosure, performance can be improved after six-axis alignment of a front body formed of a laser light transmissive molded body, a rear body formed of a laser light absorptive molded body, and a PCB including an image sensor, and a process can be simplified, components can be simplified, and production costs can be reduced.

As the above description is only an exemplary description of the spirit of the present disclosure, various changes and modifications to the scope of the present disclosure may be performed by those skilled in the art without departing from the scope of the essential characteristics of the present disclosure.

Accordingly, the embodiments shown in the present disclosure are provided not to limit but to describe the technical spirit of the present disclosure, and the scope of the present disclosure is not limited by the embodiments. The scope of the present disclosure should be interpreted by the claims which will be described below, and their equivalents should be interpreted to be included in the scope of the present disclosure.

What is claimed is:

1. A camera module package for a vehicle comprising:
 a front body comprising a housing, a lens, and a retainer;
 a rear body disposed behind the front body; and
 a printed circuit board (PCB) provided with an image sensor and configured to be mounted between the front body and the rear body, wherein:
 the front body is formed of a laser light transmissive molded body,
 the rear body is formed of a laser light absorptive molded body,
 the front body, the rear body, and the PCB are subjected to six-axis alignment and then laser-welded together, and
 the retainer is made of rubber or silicone material.

2. The camera module package of claim 1, wherein the housing is integrally formed with a barrel to fix the lens and the retainer.

3. The camera module package of claim 1, wherein the housing further comprises a lens and a spacer configured to adjust an interval of the lens.

4. The camera module package of claim 1, wherein the housing further comprises a filter configured to block light of an unnecessary wavelength range.

5. The camera module package of claim 1, wherein the housing further comprises an O-ring configured to block moisture and foreign matter to an inside thereof.

6. The camera module package of claim 1, wherein a coating agent is applied on an outer surface of the housing to block light from an unnecessary light source.

7. The camera module package of claim 1, wherein the retainer is mounted at an end portion of a barrel of the housing.

8. The camera module package of claim 1, wherein the rear body has an open front in a rectangular shape and a mounting space configured to accommodate the PCB therein.

9. The camera module package of claim 1, wherein the PCB comprises the image sensor configured to convert a light source collected at the lens to an electrical signal and a substrate on which the image sensor is mounted.

10. The camera module package of claim 2, wherein the housing further comprises a lens and a spacer configured to adjust an interval of the lens.

11. The camera module package of claim 2, wherein the housing further comprises a filter configured to block light of an unnecessary wavelength range.

12. The camera module package of claim 2, wherein the housing further comprises an O-ring configured to block moisture and foreign matter to an inside thereof.

13. The camera module package of claim 2, wherein a coating agent is applied on an outer surface of the housing to block light from an unnecessary light source.

14. A method of manufacturing a camera module package for a vehicle, comprising the steps of:
 manufacturing a rear body having an open front and a mounting space formed therein;
 mounting a PCB provided with an image sensor in the mounting space of the rear body;
 mounting a front body in front of the rear body, the front body comprises a housing, a lens, and a retainer; and
 aligning the rear body, the PCB, and the front body and laser-welding the rear body, the PCB, and the front body, wherein:
 the front body is formed of a laser light transmissive molded body,
 the rear body is formed of a laser light absorptive molded body,
 the front body, the rear body, and the PCB are subjected to six-axis alignment and then laser-welded together with a laser beam, and
 the retainer is formed of rubber or silicone material.

15. The method of claim 14, wherein the laser beam is irradiated to only a minimal extent of welding surfaces between the front body, the PCB, and the rear body to laser-weld the front body, the PCB, and the rear body.

* * * * *